May 26, 1925.
C. I. GOODWIN
1,539,179
SPRING CONNECTION FOR MOTOR VEHICLES
Filed Oct. 7, 1922
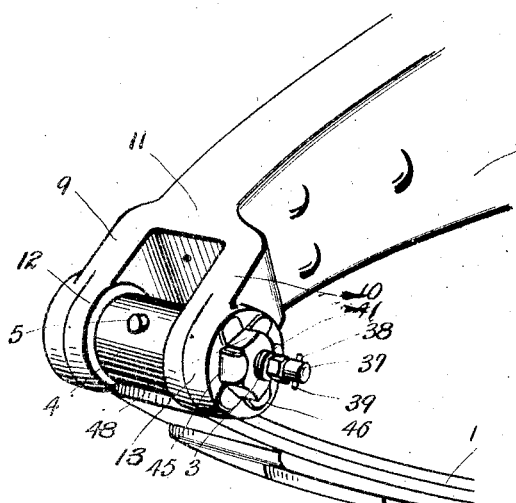
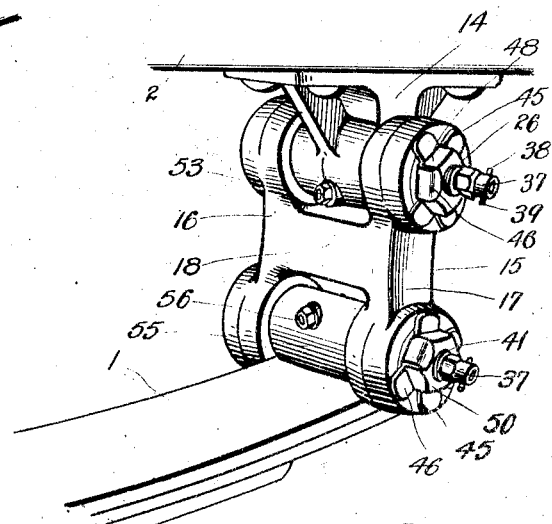
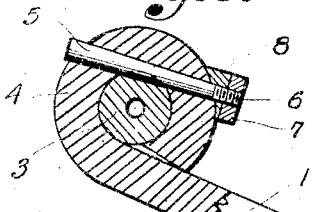
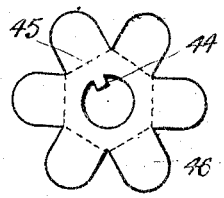
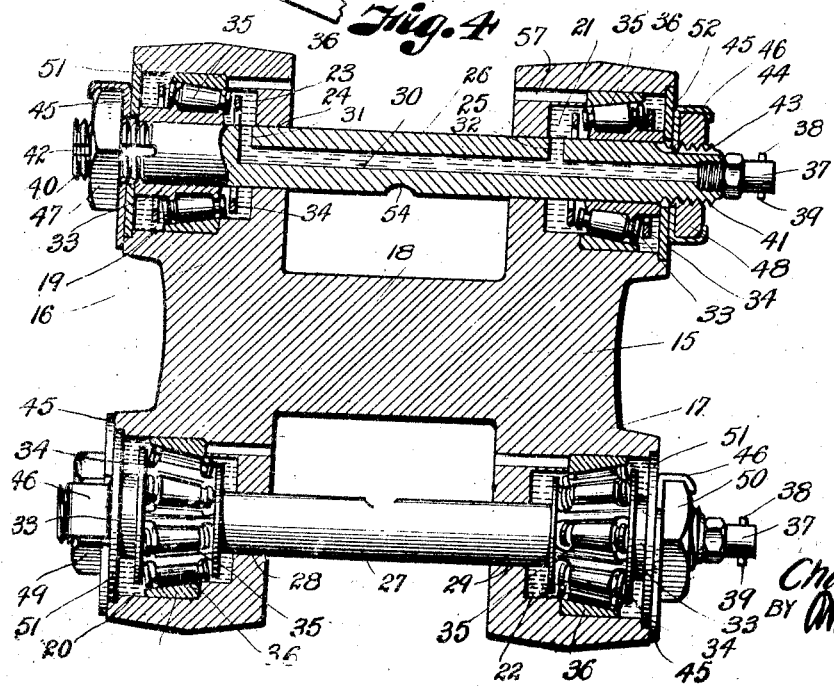
INVENTOR
Charles I. Goodwin
BY
ATTORNEY Patented May 26, 1925.

1,539,179

UNITED STATES PATENT OFFICE.

CHARLES I. GOODWIN, OF KANSAS CITY, MISSOURI.

SPRING CONNECTION FOR MOTOR VEHICLES.

Application filed October 7, 1922. Serial No. 593,053.

*To all whom it may concern:*

Be it known that I, CHARLES I. GOODWIN, a citizen of the United States, residing at Kansas City, in the county of Jackson and State of Missouri, have invented certain new and useful Improvements in Spring Connections for Motor Vehicles; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to an improved spring shackle for motor vehicles and the like.

The primary object of the invention is to provide a strong, durable and easily accessible spring shackle which, when applied, will prevent rattling and squeaking which is usually present in conventional types of vehicles.

My invention contemplates a spring shackle wherein there will be a minimum amount of friction whereby better lubrication can be effected because the device will hold the grease or lubricant.

I also employ anti-friction bearings adjustable to all motion, whether up or down or due to longitudinal thrusts.

The invention is so constructed that the bearings can be easily adjustable and any standard make of roller bearing can be incorporated in the structure.

The novel features of the invention will become more clearly apparent by reference to the following description in connection with the accompanying drawings, in which—

Fig. 1 is a perspective view of one end of the side bar of the chassis frame to which a spring is secured in accordance with my invention.

Fig. 2 is a perspective view of the shackle for the opposite end of the spring showing it applied to the chassis frame.

Fig. 3 is a transverse, sectional view through the spring connection shown in Fig. 1.

Fig. 4 is an enlarged vertical section through the shackle showing the shackle bolts and bearings in place, and Fig. 5 is a detail view of a lock washer adapted to be used in connection with the invention.

The spring 1 is shown as being fastened to the end of the side bar 2 of the chassis frame by a bolt 3, one leaf of the spring being bent around the bolt in the form of a loop 4 and fastened thereto by a tapered pin 5, which passes transversely through the loop 4 and through a transverse notch in the bolt 3. The constricted end of the tapered pin 5 is provided with threads 6, on which is received a nut 7, there being a wedge-shaped washer 8 shown in Fig. 3 between the nut and the outer face of the loop 3, as will be understood by reference to Fig. 3.

The tapered pin can be drawn tight by the nut 7 so that the bolt 3 must turn with the loop in the projections 9 and 10 of the bifurcated end 11 of the side bar 2. The projections of the bifurcation 11 are provided with recessed members 12 and 13, in which are bearings for supporting the bolt 3, these bearings being shown in detail in Fig. 4 in connection with the shackle for supporting the opposite end of the spring 1.

The shackle is supported from the hanger or bracket 14, which may be secured to the side bar of the chassis frame in any well known manner, and it, in turn, supports the spring 1, as will be apparent by reference to Fig. 2.

The shackle is designated generically 15 and it consists of an H-shaped member, having two side bars 16 and 17 connected by an intermediate cross bar 18 so that the two side bars 16 and 17 are held the proper distance apart.

The ends of the side bar 15 are provided with recesses 19 and 20, corresponding to similar recesses 21 and 22 in the bar 17.

Each recess is provided with a countersunk recess, for example, like 23 in the recess 19, and the complementary recesses, such as 19 and 21 and 20 and 22 are provided with aligning openings 24 and 25, in which is a shackle bolt 26; a similar bolt 27 passing through aligning openings 28 and 29 in the floors of the recesses 20 and 22. The bolts are hollow and each is provided with a central longitudinal channel 30, having transverse outlets 31 and 32, which discharge into the counter-sunk portions of the respective recesses so that lubricant may be passed into the counter-sunk portions and be retained therein to lubricate the bearings.

The bearings consist of the cones 33, the bearing roller cages 34 with their rollers 35, and the cups or outer races 36, which are received within the recesses at the ends of the bars 16 and 17. The bearings are tapered roller bearings, as will be apparent by reference to the drawings, and the cones are mounted upon the bolts where they can be adjusted longitudinally to take up play caused by wear.

The bolts are provided with lubricant filler nipples 37, which may be of conventional design as, for example, like the one shown at the upper right hand corner of Fig. 4, provided with oppositely disposed pins or lugs 38 and 39 by means of which a grease gun can be attached to the nipple to force the lubricant into the channel 30, it being understood that there is a check valve in the nipple but since the nipple is of common construction well known to the automobile industry, it is thought it is unnecessary to specifically illustrate or describe it here.

On the ends of the bolts are threaded portions 40 and 41, having grooved portions 42 and 43. The grooved portions receive the tongues 44 of the lock washer 45, provided with a plurality of bendable fingers 46, adapted to be bent over the nuts 47 and 48 on the bolt 26 and over similar nuts 49 and 50 on the bolt 27. The nuts can be screwed up on the threaded portions of the bolt to take up wear and tear, the washers bearing against the cap plates 51 and 52 so as to close the recesses through which the bolts project.

The hanger or bracket 14 is provided with a tapered bolt 53, which passes through it transversely and through a notch 54 in the bolt 26 so that the bolt 26 is held stationary and the shackle swings about the axis of the bolt on the bearings in the recesses at the upper ends of the bars 16 and 17.

The bolt 27 is fastened to the loop 55 on the end of the spring 1 by a tapered pin 56, conforming to the tapered pin 5, shown in Fig. 3. Therefore, the bolt 27 and loop 55 will be fastened together so that the bolt 27 will rotate about its axis in the bearings at the lower end of the side bars 16 and 17. The construction of the bolt 27 being identical with that of the bolt designated 26 and the bearings having the same relation, it is thought to be unnecessary to describe them in detail. Suffice it to say that the bearings are preferably tapered roller bearings, adjustable in tapered cups or outer races.

The shackle bolts are provided with a circular series of roller bearings about each end so that they can compensate for all motion in any direction, whether up or down or sidewise. Therefore, the shackles will serve the purpose of adequately attaching the springs without liability of rattling or without undue friction, squeaking and similar noises being wholly eliminated.

The accessibility of the bearings for the shackles as well as the outer end connection will be apparent by reference to the drawings, it being clear that it will be only necessary to loosen the nuts to have access to the bearings either for adjustment or for any other purpose.

It will also be apparent that the device is strong, durable and while easily accessible, it may be conveniently lubricated, the recesses in which the bearings are located having adequate capacity to receive a sufficient supply of lubricant and hold it where it can be utilized by the bearings, thus friction will be reduced to a minimum and a spring shackle will be provided which will eliminate practically all of the difficulties now encountered in devices designed for similar purposes.

If desired, openings 57 may be provided to receive drift pins or punches to assist in dislodging the cups or outer races when it is desired to take out the bearing.

What I claim and desire to secure by Letters-Patent is:

A spring connection for motor vehicles comprising a support having spaced anti-friction bearings located at opposite sides of the support, a hollow bolt mounted in the bearings and extending entirely through and projecting beyond both sides of the support exteriorly of the same, the opening in the hollow bolt extending from one end thereof, and terminating short of the other end of the same and the said bolt having ports leading from the opening to the bearings, nuts directly engaging the ends of the bolt and holding the same against longitudinal movement in the said bearings, a spring having a loop and encircling the bolt between the bearings, and a pin passed transversely through the loop of the spring beyond the opening in the bolt and arranged in a notch in the latter whereby the loop of the spring is directly secured to the hollow bolt for preventing independent rotary and longitudinal movement of the loop and the bolt In testimony whereof I affix my signature

CHARLES I. GOODWIN.